United States Patent Office 3,027,267
Patented Mar. 27, 1962

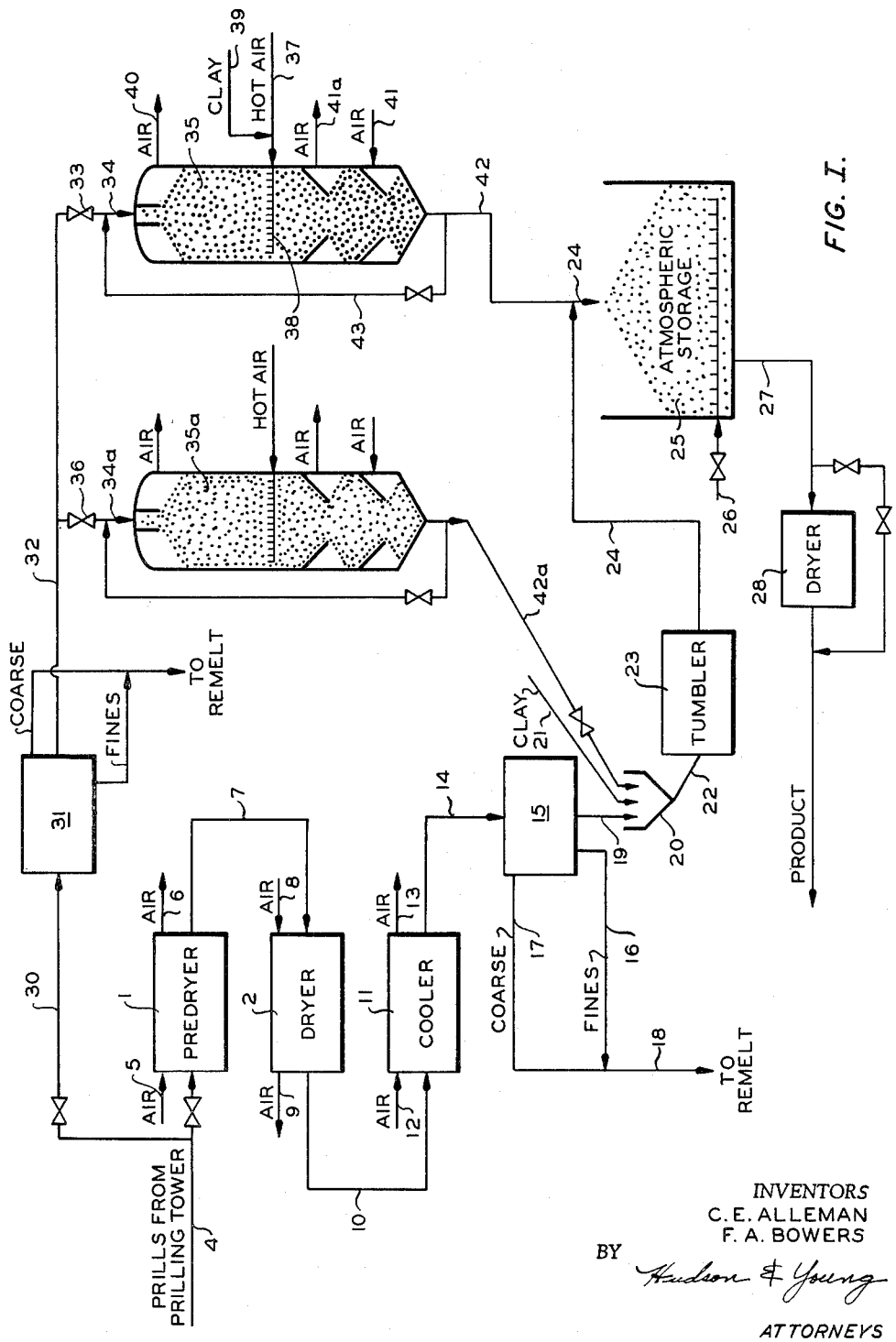
FIG. I.
INVENTORS
C. E. ALLEMAN
F. A. BOWERS
BY Hudson & Young
ATTORNEYS

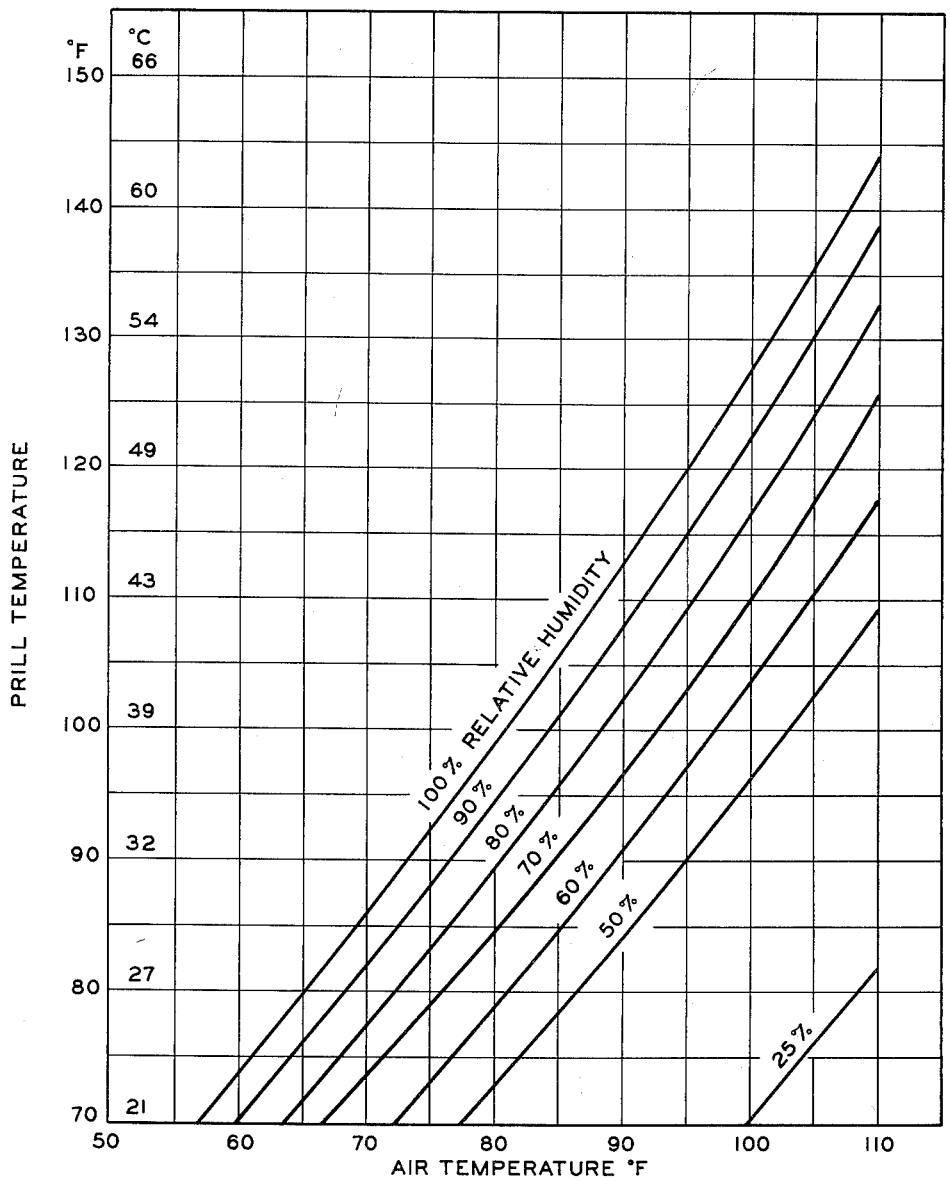
FIG. II.

3,027,267
PROCESS FOR DRYING GRANULAR COATED AMMONIUM NITRATE
Carl E. Alleman, Cactus, and Frederick A. Bowers, Dumas, Tex., assignors to Phillips Petroleum Company, a corporation of Delaware
Filed Oct. 3, 1957, Ser. No. 687,984
11 Claims. (Cl. 117—16)

This invention relates to a process for making granular, dried, and coated ammonium nitrate. In a specific aspect, the invention relates to a method of coating and drying prilled ammonium nitrate to produce prills resistant to caking on storage.

The granulation or prilling of normally solid materials by spraying the same in molten form into a cooling tower is conventional in the art. Patent 2,402,192, issued June 19, 1946, to Williams et al., illustrates one process for prilling ammonium nitrate by spraying in a cooling tower the molten salt and allowing it to fall countercurrent to the flow of cooling air. The solid prills are recovered from the bottom of the tower by means of a conveyor which delivers the prills to conveyor means for transfer to a conventional dryer for removal of moisture of the prills.

Granular ammonium nitrate and particularly prilled ammonium nitrate has desirable chemical properties for use as a fertilizer since the nitrogen content is high and the salt is highly soluble. However, because of the tendency of the salt granules or prills to merge together or fuse on storage, its use for fertilizer has been restricted. Various means have been tried to alleviate this problem such as coating the prills with a class of materials known as parting agents. This coating has been done in the past by applying the parting agents such as clay in powder form to the prills after they are dried, and then packing them in closed containers for storage and shipment, usually in bags. Although such procedures are sometimes effective, they have not been entirely satisfactory since the bagged ammonium nitrate often cakes upon storage.

It is an object of this invention to provide a method for coating and drying granular ammonium nitrate whereby the tendency to cake upon storage is decreased.

It is a further object of this invention to produce according to the method coated and dried granular or prilled ammonium nitrate of reduced tendency to cake upon storage.

According to conventional procedures, prilled ammonium nitrate which usually contains from about 3.5 to 4.5 percent moisture is usually dried by passing the prilled nitrate through drying and cooling steps, and the cooled nitrate is then admixed with a parting agent such as clay and tumbled to coat the clay on the prills after which the clay coated prills are sacked. When the prilled ammonium nitrate is dried and processed according to this method, the sacked ammonium nitrate often cakes.

According to the present invention, there is provided a process whereby granular ammonium nitrate, usually in prilled form, containing moisture is first dried to a moisture content of from 0.3 to 0.8 weight percent, preferably 0.3 to 0.5 weight percent, then coated with a parting agent such as clay, preferably with 2 to 4.5 weight percent of the prill weight, and then subsequently aged without agitation of the solids, while in open communication with the atmosphere for a period of from at least 2.5 days, preferably at least 5 days. In some cases, it is desirable to maintain this aging period for 30 days or more. Depending upon the conditions existing during the aging process, such as the relative humidity of the ambient atmosphere, the temperature, etc., the prills often lose enough moisture during this step to have a moisture content of only 0.25 weight percent or less. In such a case, the aged prills are ready for bagging. The prills so treated and aged have a greatly reduced tendency to cake during storage in confined space, such as in bags. The exact reason for this phenomenon is not known, but it is believed that it is associated with the establishment of equilibrium moisture conditions throughout the prills during the aging period.

If the prills after the aging step still contain in excess of 0.25 weight percent moisture, they are preferably dried in a separate step to a moisture content of 0.25 weight percent or less. They are then ready for bagging.

The method of drying, coating, and aging the prills outlined above has been found to produce prills of lower moisture content, and less tendency to cake upon storage in a confined space, such as in bags.

While clay has been mentioned as a parting agent or coating material and is an eminently satisfactory material for this purpose, other inert solid materials are satisfactory, such as diatomaceous earth or finely divided silica. Other suitable materials are fuller's earth and other montmorillonites and kieselguhr.

FIGURE I is a schematic flow diagram showing a method of practicing the invention.

FIGURE II is a graph showing the relation between air temperature, prill temperature and relative humidity of the air. It is self explanatory.

Referring to FIGURE I, ammonium nitrate prills which have been formed in a prilling tower (not shown) enter predrying zone 1 through line 4 where they are contacted with air entering line 5 and leaving the drying zone through line 6. In this embodiment, the driers are conventional horizontal rotary type driers. The prills are partially dried in zone 1 from which they are passed to drying zone 2 through line 7 where they are again contacted with air entering through line 8 and leaving through line 9. The prills, still containing some moisture, are passed from drying zone 2 through line 10 to cooling zone 11 into which air is introduced through line 12 and leaves through line 13. This air is not heated but is dry enough so that there is no absorption of moisture by the prills in cooling zone. It can be at ambient temperature of up to 110° F. or it can be refrigerated to as low as 40° F. or even lower. The air enters cooler 11 at a temperature usually in the range from 60 to 90° F. The drying air entering predrier 1 is preferably in the range from 160 to 180° F., while the drying air entering drier 2 is preferably in the range from 280 to 310° F. The prills then pass through line 14 to size separation zone 15. Size separation can be by any suitable means but is desirably effected by a screening operation, so that fines and coarse material are passed from this zone via lines 16 and 17 to line 18 from which they pass to a remelting zone (not shown) and are recycled to the prilling operation. The desired product size pellets pass from the separation zone via line 19 to parting agent addition zone 20 into which a finely divided inert solid such as clay is added by means of line 21. The mixture of parting agent and ammonium nitrate prills passes through line 22 to tumbler 23 wherein the prills are uniformly coated with the parting agent. The coated product passes via line 24 to storage bin 25. The prills remain in storage bin 25 for an aging period of at least 2.5 to 30 days or more in open communication with the atmosphere. In some cases, if desired, the prills can be subjected to a slow current of suitably dry air admitted through line 26 during the aging period.

In the event that the prills after aging still contain in excess of 0.25 weight percent moisture, they are preferably removed from bin 25 via 27, and are subjected to a further conventional drying step in drier 28 to reduce the moisture to less than 0.25 weight percent. They are then ready for bagging.

Another advantageous method for obtaining the predried prills is to feed all of the prills from the prilling tower in line 4 to line 30 and to size separation zone 31, in which coarse and fine particles are separated and sent to remelt as before, and from which the desired size prills are transferred through line 32, valve means 33, and line 34 to countercurrent drier 35, valve means 36 being closed. The prills slowly gravitate downwardly as a continuous downflowing column of granular material in drier 35. Hot air, usually in the temperature range from 280 to 310° F., is introduced through line 37 into drier 35 through gas distributing means 38. The hot air contains finely divided parting or coating agent, such as clay, introduced through line 39. As the air passes upwardly, and finally out through line 40, it countercurrently contacts the descending column of prills and dries them, while application of the coating agent carried thereby is also countercurrently effected; that is, the prills are most heavily coated at the point of introduction of the clay, while some of the clay travels upwardly and applies an initial coating of clay on the prills at a higher level in the drier. This countercurrent action is also beneficial to the drying process, and practically eliminates any loss of clay in line 40. As the coated prills descend, they are further contacted with air introduced through line 41 and removed through line 41a, said air being introduced at a temperature in the range from 60 to 90° F. In this latter countercurrent contact zone, the prills are further dried and are cooled by the countercurrent contact with the air. The so treated prills then pass through line 42 into line 24, and to further processing as before described. Recycle line 43 is provided for recycling a small fraction of the dried prills to the top of the tower 35, if desired, as the dried prills aid in the drying operation and in maintaining flow without sticking. Usually less than 10 weight percent of the prills passing through valve 33 are recycled.

In another advantageous variation of the preliminary treatment steps, according to this invention, valve 33 is closed and valve 36 is open. In this embodiment, the prills flow to drier 35a through line 34a. This embodiment will not be further described, since it is identical with the embodiment described with respect to drier 35, except that clay is not introduced into the drying zone, so that the effluent from the drying zone flows to zone 20 and is handled thereafter as described with respect to the first embodiment of the invention.

Other advantages of the continuous gravitating bed method of drying the prills, with or without clay, as just described, are that it has been found that prills need to be preconditioned by temperatures that are low compared to those desired for fast drying, since when this preconditioning is not effected and fresh prills are introduced directly to the high temperature drying, the prills resist drying for a longer period than when preconditioned by a period of drying under milder conditions. It is believed that this phenomenon is associated with the formation of a hard, relatively impervious crust or shell on the prills when initially exposed to high temperature drying air. It will be seen that the countercurrent method of drying, as described, provides for lower temperatures automatically in the top part of the drier 35 or 35a, thus providing automatically the preconditioning zone. Moreover, in one vessel, there are obtained several temperatures, that is, several sets of conditions, without resort to the several separate drying vessels of the prior art. Furthermore, this method of handling the prills greatly reduces the attrition and breaking of prills inherent to some extent in the grinding and tumbling action of previously employed driers, such as the driers 1 and 2 of FIGURE I.

It will be understood, of course, that the various air streams employed in the various steps of the invention are of such relative humidity that the ammonium nitrate prills will not gain any net moisture in the respective steps. In FIGURE II, there is shown a chart by which one skilled in the art can easily determine the maximum humidity under the conditions of operation which can be tolerated in the air employed. Of course, in the drying steps, the air must have less than this so determined maximum humidity.

*Example I*

Ammonium nitrate prills containing approximately 4 percent moisture, and produced in a commercial prilling tower, were subjected to predrying, drying, and cooling operations, each operation in a rotary tumbler while passing air at a suitable temperature through the tumbled prills. The cooled prills were then screened to remove the coarse and fines and were thereafter coated with approximately 4 weight percent clay by tumbling. The prills were then stored for periods varying from 3 to 7 days in a large open bin, open at the top to the atmosphere. At the end of this time, the prills contained 0.21 percent moisture and were placed in 32 fertilizer bags, which were sealed. These bags were then stored, sealed, for more than four months.

Another batch of ammonium nitrate prills prepared in the same manner, but not stored in an open bin, was dried to 0.22 weight percent moisture in a tumbled drier in a period of less than one hour. Twenty bags of this material were prepared and sealed, as with the bin-stored bags. These bags were also stored, sealed, for a period of over four months.

At the end of this time, all of the bags from each of the tests were opened and the material examined for acceptability or non-acceptability with regard to the physical state. If there was no caking or only such slight caking of the prills that the cake broke up on pouring fertilizer from the bag, the material was acceptable. If the caking was so severe that it could only be broken by hand pressure or could not be broken at all, the material was not acceptable. Of the 32 bin stored bags, 27 were acceptable (84½ percent) and of the bags which were conventionally dried and not bin stored, only 55 percent were acceptable.

*Example II*

Batches of ammonium nitrate prills prepared as described in Example I, first paragraph, except that they were bin stored for the periods of time shown in the following table, were subjected to a caking test. The initial percent moisture before bin storage is given in the second column, while the percent moisture after the bin storage and before sealing in fertilizer bags is given in the third column. The caking test was an accelerated test in which the bags of ammonium nitrate were stored at 0° C. for 48 hours and then stored at above 40° C. for 48 hours. Batches 1, 2, 3, and 4 were caked to a severity decreasing in the order named. None was acceptable product. Batch 5 contained only a very few soft lumps which broke up on handling and pouring from the bag. It was acceptable commercial product.

| Batch No. | Percent $H_2O$ | After Time Lapse, Percent $H_2O$ | Time Lapsed, Hours |
| --- | --- | --- | --- |
| 1 | 0.50 | 0.30 | 16 |
| 2 | 0.50 | 0.26 | 24 |
| 3 | 0.49 | 0.10 | 40 |
| 4 | 0.44 | 0.12 | 48 |
| 5 | 0.50 | 0.12 | 64 |

As will be evident to those skilled in the art, various

We claim:

1. The method of preparing granular ammonium nitrate of reduced tendency to cake upon storage in a confined space which comprises partially drying granular ammonium nitrate coating the granular ammonium nitrate so dried with a finely divided inert solid material as a parting agent, then storing said granular ammonium nitrate in open communication with the atmosphere for an aging period of at least 2.5 days under conditions of relative humidity and temperature such that said ammonium nitrate is dried to a moisture content of less than about 0.25 weight percent.

2. The method of claim 1 wherein the aged ammonium nitrate granules are further dried in a separate step after said aging step to a moisture content in the range from 0 to 0.25 weight percent moisture.

3. The method of preparing granular ammonium nitrate of reduced tendency to cake upon storage in a confined space which comprises partially drying the ammonium nitrate until it contains from 0.3 to 0.8 weight percent moisture, coating the granular ammonium nitrate so dried with a finely divided inert solid material as a parting agent, storing said granular ammonium nitrate in open communication with the atmosphere for an aging period of at least 2.5 days, while allowing a slow current of atmospheric air to pass through said granular ammonium nitrate under conditions of relative humidity and temperature such that said ammonium nitrate is dried to a moisture content of less than about 0.25 weight percent.

4. The method of preparing ammonium nitrate prills which comprises partially drying ammonium nitrate prills containing moisture by flowing said prills downwardly countercurrent to an upward flow of hot air flowing in contact with said prills in the opposite direction to the flow of said prills, and then further downwardly flowing said prills countercurrent to an upward flow of cool air flowing in contact with said prills in the opposite direction to the flow of said prills, coating said prills with a finely divided solid parting agent, and thereafter aging said prills by storing said prills in a mass open to the atmosphere for a period of at least 2.5 days under conditions of relative humidity and temperature such that said ammonium nitrate prills are dried to a moisture content of less than about 0.25 weight percent.

5. The method of preparing ammonium nitrate prills which comprises coating and partially drying ammonium nitrate prills containing moisture by flowing said prills downwardly in a columnar gravitating mass countercurrent to an upward flow of hot air flowing in contact with said mass in the opposite direction to the flow of said mass, said air containing suspended therein finely divided particles of solid parting agent, and then further downwardly flowing said gravitating mass countercurrent to an upward flow of cooling air flowing in contact with said mass in the opposite direction to the flow of said mass, thereby drying, coating, and cooling said prills during their flow in said columnar mass, and thereafter aging said prills by storing said prills in a mass open to the atmosphere for a period of at least 2.5 days under conditions of relative humidity and temperature such that said ammonium nitrate prills are dried to a moisture centent of less than about 0.25 weight percent.

6. The method of claim 5 including a step of recycling a minor proportion of said prills removed from said columnar mass to the top of said columnar gravitating mass.

7. The method of preparing ammonium nitrate prills which comprises coating and partially drying ammonium nitrate prills containing moisture by flowing said prills downwardly in a columnar gravitating mass countercurrent to an upward flow of hot air flowing in contact with said mass in the opposite direction to the flow of said mass, said air containing suspended therein finely divided particles of solid parting agent, and then further downwardly flowing said gravitating mass countercurrent to an upward flow of cooling air flowing in contact with said mass in the opposite direction to the flow of said mass, thereby drying, coating, and cooling said prills during their flow in said columnar mass, and thereafter aging said ammonium nitrate prills by storing said prills in a mass open to the atmosphere for a period of at least 2.5 days under conditions of relative humidity and temperature such that said ammonium nitrate prills are dried to a moisture content of less than about 0.25 weight percent.

8. The method of preparing ammonium nitrate prills which comprises partially drying ammonium nitrate prills containing moisture by flowing said prills downwardly in a columnar gravitating mass countercurrent to an upward flow of hot air flowing in contact with said mass in the opposite direction to the flow of said mass, and then further downwardly flowing said gravitating mass countercurrent to an upward flow of cool air flowing in contact with said mass in the opposite direction to the flow of said mass, removing said prills from said columnar mass, and thereafter aging said ammonium nitrate prills by storing said prills in a mass open to the atmosphere for a period of at least 2.5 days under conditions of relative humidity and temperature such that said ammonium nitrate prills are dried to a moisture content of less than about 0.25 weight percent.

9. The method of preparing granular ammonium nitrate prills which comprises partially drying granular ammonium nitrate prills containing moisture by flowing said prills downwardly in a columnar gravitating mass countercurrent to an upward flow of hot air flowing in contact with said mass in the opposite direction to the flow of said mass, then further downwardly flowing said gravitating mass countercurrent to an upward flow of cool air flowing in contact with said mass in the opposite direction to the flow of said mass, removing said prills from the bottom of said columnar mass, recycling a minor portion of said removed prills to the top of said columnar gravitating mass, and thereafter aging said ammonium nitrate prills by storing said prills in a mass open to the atmosphere for a period of at least 2.5 days under conditions of relative humidity and temperature such that said ammonium nitrate prills are dried to a moisture content of less than about 0.25 weight percent.

10. The method of preparing granular ammonium nitrate of reduced tendency to cake upon storage in a confined space which comprises partially drying the ammonium nitrate until it contains from 0.3 to 0.8 weight percent moisture, coating the granular ammonium nitrate so dried with a finely divided inert solid material as a parting agent, selected from the group consisting of clay, diatomaceous earth, silica, montmorillonites, and kieselguhr, and then storing said granular ammonium nitrate in open communication with the atmosphere for an aging period of at least 2.5 days under conditions of relative humidity and temperature such that said ammonium nitrate prills are dried to a moisture content of less than about 0.25 weight percent.

11. The method of preparing granular ammonium nitrate of reduced tendency to cake upon storage in a confined space which comprises partially drying the ammonium nitrate until it contains from 0.3 to 0.8 weight percent moisture, coating the granular ammonium nitrate so dried with a finely divided inert solid material as a parting agent, and then storing said granular ammonium nitrate in open communication with the atmosphere for an aging period of at least 2.5 days under conditions of relative humidity and temperature such that said ammonium nitrate prills are dried to a moisture content of less than about 0.25 weight percent, and thereafter bagging said granular ammonium nitrate containing less than 0.25 weight percent moisture in closed bags.

References Cited in the file of this patent

UNITED STATES PATENTS

| | | |
|---|---|---|
| 1,601,898 | Wiley et al. | Oct. 5, 1926 |
| 2,041,088 | Pfirrmann | May 19, 1936 |
| 2,402,192 | Williams et al. | June 18, 1946 |
| 2,644,769 | Robinson | July 7, 1953 |
| 2,764,819 | Hallman | Oct. 2, 1956 |
| 2,782,108 | Antle | Feb. 19, 1957 |
| 2,879,133 | Marti | Mar. 24, 1959 |
| 2,901,317 | Marti | Aug. 25, 1959 |